(12) United States Patent
Irie

(10) Patent No.: US 6,530,763 B2
(45) Date of Patent: *Mar. 11, 2003

(54) TIRE VULCANIZING SYSTEM

(75) Inventor: Nobuhiko Irie, Nagasaki (JP)

(73) Assignee: Mitsubishi Heavy Industries, Ltd., Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/311,507

(22) Filed: May 13, 1999

(65) Prior Publication Data

US 2002/0041910 A1 Apr. 11, 2002

(51) Int. Cl.$^7$ ................................................ B29C 35/02
(52) U.S. Cl. ......................................... 425/34.1; 425/38
(58) Field of Search ................................... 425/34.1, 38

(56) References Cited

U.S. PATENT DOCUMENTS

| 1,859,849 A | | 5/1932 | Stevens et al. |
| 5,820,885 A | * | 10/1998 | Irie ............................. 425/34.1 |
| 5,928,675 A | * | 7/1999 | Irie ............................. 425/34.1 |

FOREIGN PATENT DOCUMENTS

| EP | 0 727 296 | 8/1996 |
| GB | 1 136 712 | 12/1968 |
| JP | 07080846 | 3/1995 |
| JP | 08047928 | 2/1996 |
| JP | 08164528 | 6/1996 |
| JP | 08 281655 | 10/1996 |

* cited by examiner

Primary Examiner—James P. Mackey (57) ABSTRACT

There is provided a tire vulcanizing system which can easily be arranged in an existing tire factory. The present invention provides a tire vulcanizing system having a vulcanizing station 100 for mounting a plurality of sets of tire mold assemblies M on a flat surface of a predetermined height and a tire mold opening/closing station 200 formed along the vulcanizing station 100, in which a tire mold opening/closing device 210, which takes out the tire mold assembly M from the vulcanizing station 100, and opens and closes the tire mold assembly M, is provided at the tire mold opening/closing station 200, and the tire mold opening/closing device 210 is provided with an upper movable plate 206 capable of elevating an upper mold Ma of the tire mold assembly M by connecting with the upper mold Ma, a horizontal transfer device 215 for transferring the tire mold assembly M on the same level as the height of the flat surface, and a lower fixed plate 211 capable of fixing a lower mold Mb of the tire mold assembly M.

2 Claims, 5 Drawing Sheets

TIRE VULCANIZING SYSTEM

BACKGROUND OF THE INVENTION

1. Field of the Invention

The present invention relates to a tire vulcanizing system.

2. Description of the Related Art

In a conventional fully automatic tire vulcanizing press, the work time for loading and shaping a green tire and for unloading a vulcanized tire is far shorter than the time over which vulcanization is performed by introducing a heating/pressurizing medium in a tire in a state in which a tire mold assembly is closed. Therefore, a tire mold opening/closing device for opening/closing the tire mold assembly to loading/unloading a tire after the completion of vulcanization and a tire loading/unloading device are law in operation efficiency.

To solve this problem, the applicant of this invention has already proposed a tire vulcanizing system disclosed in Japanese Patent Provisional Publication No. 7-80846 (No. 80846/1995). This tire vulcanizing system comprises vulcanizing stations $a_1$ and $a_2$, mold opening/closing stations $b_1$ and $b_2$, tire mold transporters $c_1$ and $c_2$, rails d for the tire mold transporters, mold beds $e_1$ to $e_3$, tire mold opening/closing devices $f_1$ and $f_2$, unloaders $g_1$ and $g_2$, loaders $h_1$ and $h_2$, conveyors $i_1$ and $i_2$ for conveying vulcanized tires, racks $J_1$ and $J_2$ for green tires, and a mold changing table (a mold changing table for changing a tread mold, side wall mold, etc. in a tire mold assembly to accommodate a change of specification of a tire to be vulcanized and for changing a bladder, which is an expendable) k.

The following is a description of a tire vulcanizing process using a tire vulcanizing system having the above-described configuration.

First, a tire mold assembly M for which vulcanization has been finished is received by the tire mold transporter $c_1$ from the vulcanizing station $a_1$ (or $a_2$) at which a plurality of tire mold assemblies M being vulcanized are arranged, and is transported to the mold opening/closing station $b_1$. Then, after the tire mold assembly M having transported to the mold opening/closing station $b_1$ is connected to the tire mold opening/closing device $f_1$, the tire mold assembly M is opened by the tire mold opening/closing device $f_1$, and a vulcanized tire is unloaded by the unloader $g_1$ attached to the tire mold opening/closing device $f_1$. Next, a green tire is loaded, by using a loader $h_1$ attached to the tire mold opening/closing device $f_1$, into the tire mold assembly M from which the vulcanized tire has been unloaded. Subsequently, after the loaded tire is shaped during a tire mold closing step and the tire mold assembly M is closed, a heating/pressurizing medium is introduced and sealed in the tire, by which a tire vulcanizing step is started. Then, the tire mold assembly M in which vulcanization has been started is disconnected from the tire mold opening/closing device $f_1$, placed on the tire mold transporter $c_1$ again and transported, and returned to the vulcanizing station $a_1$.

When the above-described tire vulcanizing system is applied to a tire production facility whose vulcanization time is as short as, for example, 8 to 10 minutes, the following requirements are encountered.

(1) The time over which the mold transporter receives a tire mold assembly at the vulcanizing station, the work at the mold opening/closing station is finished, and again, the closed tire mold assembly is transported and returned to the vulcanizing station must be made as short as possible. This is because the number of tire mold assemblies constituting the tire vulcanizing system cannot be increased from the economical viewpoint.

(2) From the viewpoint of operation control in which a tire mold assembly having been used out during the operation is carried out, or a new tire mold assembly is put in during system operation in place of the carried-out tire mold assembly, it is preferable that the transportation time for each of the tire mold assemblies arranged in several numbers be made equal. Specifically, it is preferable that the transportation time for a tire mold assembly close to the mold opening/closing station be approximately equal to that for a tire mold assembly distant from the mold opening/closing station.

(3) After the mold is closed at the mold opening/closing station, the heating/pressurizing medium introduced in the tire is temporarily sealed in the tire mold assembly during the transportation, and the heating/pressurizing medium is supplied again after the tire mold assembly arrives at the vulcanizing station. Here, considering the quality control of tire, the time of temporary sealing should preferably short.

(4) When tires are continuously produced by using the tire vulcanizing system, green tires must be supplied continuously. For this purpose, it is necessary to store the most possible green tires in the vicinity of the loader disposed at the mold opening/closing station, and to supply new green tires successively.

Therefore, it has been desired to provide a tire vulcanizing system having the following features: (1) The time taken for the tire mold assembly to be returned to the vulcanizing station can be shortened, and the transportation time for a tire mold assembly close to the mold opening/closing station and that for a tire mold assembly distant from the mold opening/closing station can be made approximately equal to each other. (2) The time for the heating/pressurizing medium to be sealed temporarily in the tire mold assembly can be shortened. (3) The most possible green tires can be stored in the vicinity of the loader disposed at the mold opening/closing station, and new green tires can be supplied successively, by which the installation area can be reduced significantly.

Figure 5:
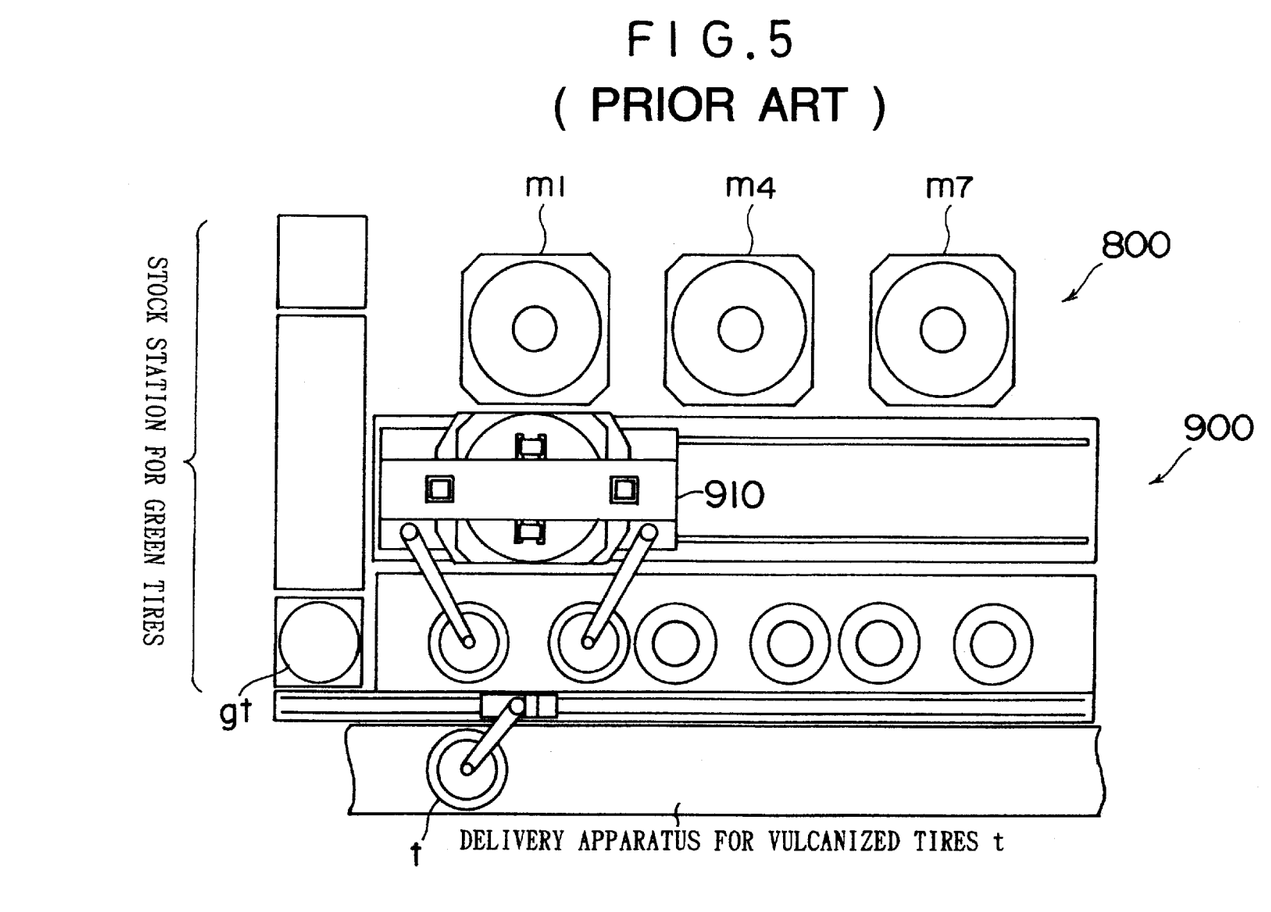
FIG. 5 is a plan view of a conventional tire vulcanizing system.

To solve the above problem, the applicant of this invention has proposed a tire vulcanizing system disclosed in Japanese Patent Provisional Publication No. 8-164528 (No. 164528/1996). The operation of this tire vulcanization system is as described below. As shown in FIG. 5, first, at least two tire mold assemblies m ($m_1, m_4, m_7$) are stacked on a storage rack at a vulcanizing station 800, and a mold opening/closing device 910 at a mold opening/closing station 900 is moved along the storage rack at the vulcanizing station 800. Next, the tire mold assembly m is removed from the vulcanizing station 800, and after the opening/closing of the tire mold assembly m, the unloading of a vulcanized tire t, and the loading of a green tire gt are performed, the tire mold assembly m is returned to the vulcanizing station 800.

However, in this tire vulcanizing system, since the vulcanizing station 800 is tall, a supply apparatus for green tires gt and a delivery apparatus for vulcanized tires t cannot be disposed over the vulcanizing station 800, and these apparatuses must be disposed concentratedly on the opposite side of the vulcanizing station 800 at which the tire mold assemblies are stacked.

SUMMARY OF THE INVENTION

Accordingly, an object of the present invention is to provide a tire vulcanizing system which can easily be arranged in an existing tire factory by arranging vulcanizing stations, the height of which is decreased, on a plane on the opposite sides of a movable tire mold opening/closing device, and by making spaces over the vulcanizing stations on both sides capable of being used for a green tire supply apparatus and a vulcanized tire delivery apparatus.

To achieve the above object, the tire vulcanizing system in accordance with one mode of the present invention has a vulcanizing station for mounting a plurality of sets of tire mold assemblies in parallel on a flat surface of a predetermined height and a tire mold opening/closing station formed along the vulcanizing station, and is characterized in that a tire mold opening/closing device, which is movable along the vulcanizing station, takes out the tire mold assembly from the vulcanizing station, and opens and closes the tire mold assembly, is provided at the tire mold opening/closing station, and the tire mold opening/closing device is provided with an upper movable plate capable of elevating an upper mold of the tire mold assembly by connecting with the upper mold, a horizontal transfer device for transferring the tire mold assembly on the same level as the height of the flat surface, and a lower fixed plate capable of fixing a lower mold of the tire mold assembly.

Also, the tire vulcanizing system in accordance with another mode of the present invention further has an unloader, which is movable integrally with the tire mold opening/closing device, for unloading a vulcanized tire, and a loader for loading a green tire.

The above-described tire vulcanizing system has the vulcanizing stations and the tire mold opening/closing station, and the tire mold opening/closing station is provided with the tire mold opening/closing device. The tire mold opening/closing device, which moves along the vulcanizing station, takes out the tire mold assembly stored at the vulcanizing station, unloads the vulcanized tire in the tire mold assembly, loads a green tire in place of the vulcanized tire, and then returns the tire mold assembly to the vulcanizing station. Thereby, the time taken for the tire mold assembly to be returned to the vulcanizing station can be shortened, so that the quality control of tire can be carried out easily.

For the tire vulcanizing system in accordance with the present invention, as described above, the vulcanizing stations are arranged on a plane, and the tire mold opening/closing device is moved along the vulcanizing station to take out the tire mold assembly from the vulcanizing station, to perform the opening/closing of the tire mold assembly, the unloading of the vulcanized tire, and the loading of a green tire, and then to return the tire mold assembly to the vulcanizing station. Therefore, the time taken for the tire mold assembly to be returned to the vulcanizing station can be shortened, and the transportation time for a tire mold assembly close to the tire mold opening/closing device can be made approximately equal to that for a tire mold assembly distant from the tire mold opening/closing device. Also, the time over which the heating/pressurizing medium is temporarily sealed in the tire mold assembly can be shortened, so that the quality control of tire can be carried out easily.

DETAILED DESCRIPTION OF PREFERRED EMBODIMENTS

The tire vulcanizing system in accordance with the present invention has two rows of vulcanizing stations on which tire mold assemblies are arranged and a tire mold opening/closing device which moves along the rack of vulcanizing station to take out a tire mold assembly from the vulcanizing station and to perform the opening/closing of the tire mold assembly, the unloading of a vulcanized tire, and the loading of a green tire. This tire vulcanizing system will be explained in detail with reference to FIGS. 1 to 4.

A vulcanizing station 100 comprises a plurality of sets of tire mold assemblies M (M1 to M6), a rack 101 for the vulcanizing station 100 for storing these tire mold assemblies M1 to M6, guide roller groups 102 disposed on the rack 101, and an internal pressure supply device (a device for supplying a heating/pressurizing medium into a tire) and an external pressure supply device (a device for supplying a heating/pressurizing medium to the outer peripheral portion of the tire mold) provided at appropriate places of the rack 101, though not shown in the figures. For the tire mold assemblies M, in FIG. 1, the mold assemblies in the north row (upper stage) are denoted by M1, M3, and M5, and the tire mold assemblies M2, M4, and M6 in the south row (lower stage) on the side opposite to the north row are not shown.

Figure 1:
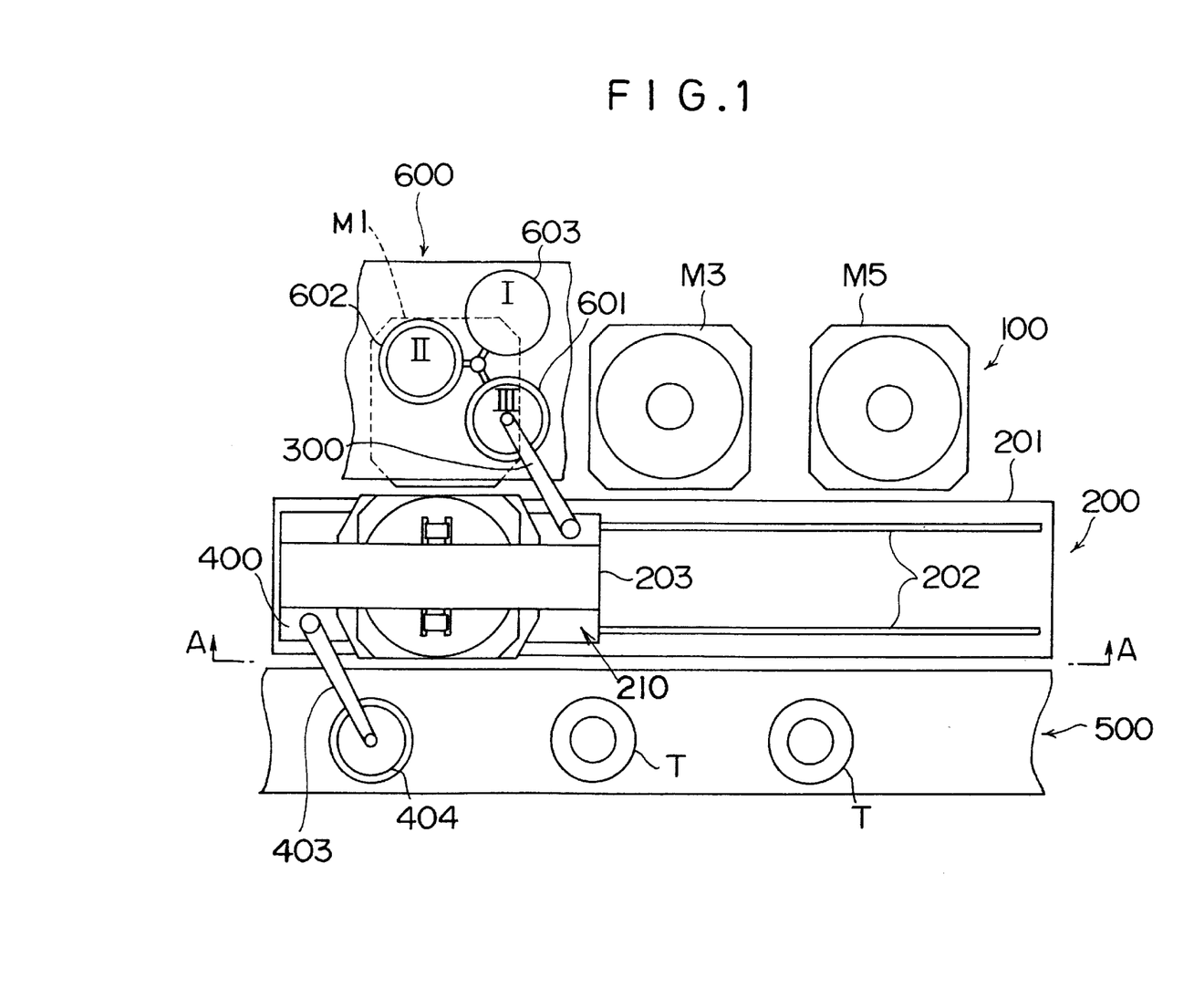
FIG. 1 is a plan view of a tire vulcanizing system in accordance with the present invention.

The guide roller group 102 is on the same level, and also on the same level as a guide roller group 214 on a lower fixed plate 211. Also, the configuration is such that when the tire mold assemblies M lie on the rack 101, the centers of tire mold assemblies substantially agree with each other.

Figure 2:
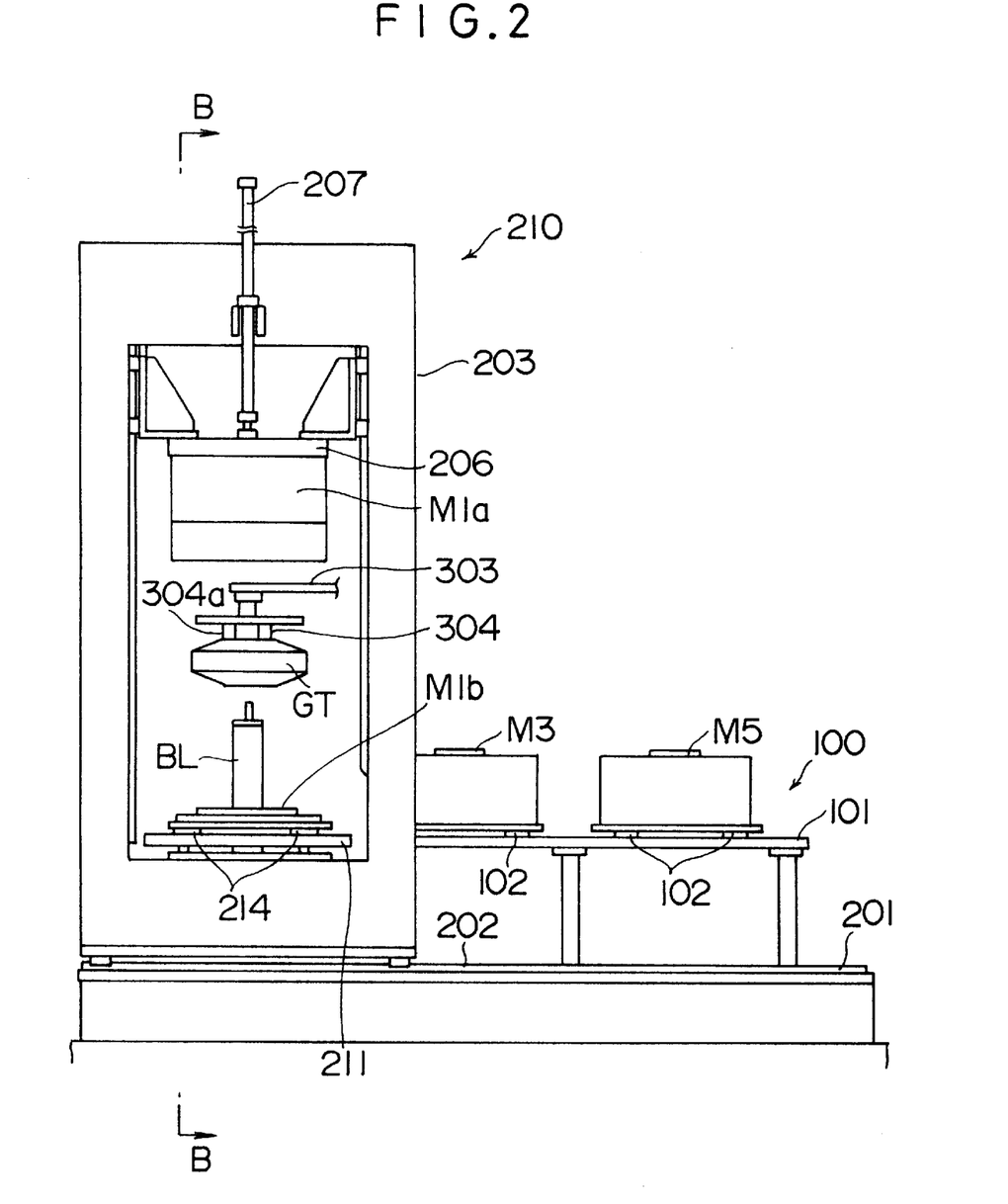
FIG. 2 is a side view taken in the direction of the arrows along the line A—A of FIG. 1.
Figure 3:
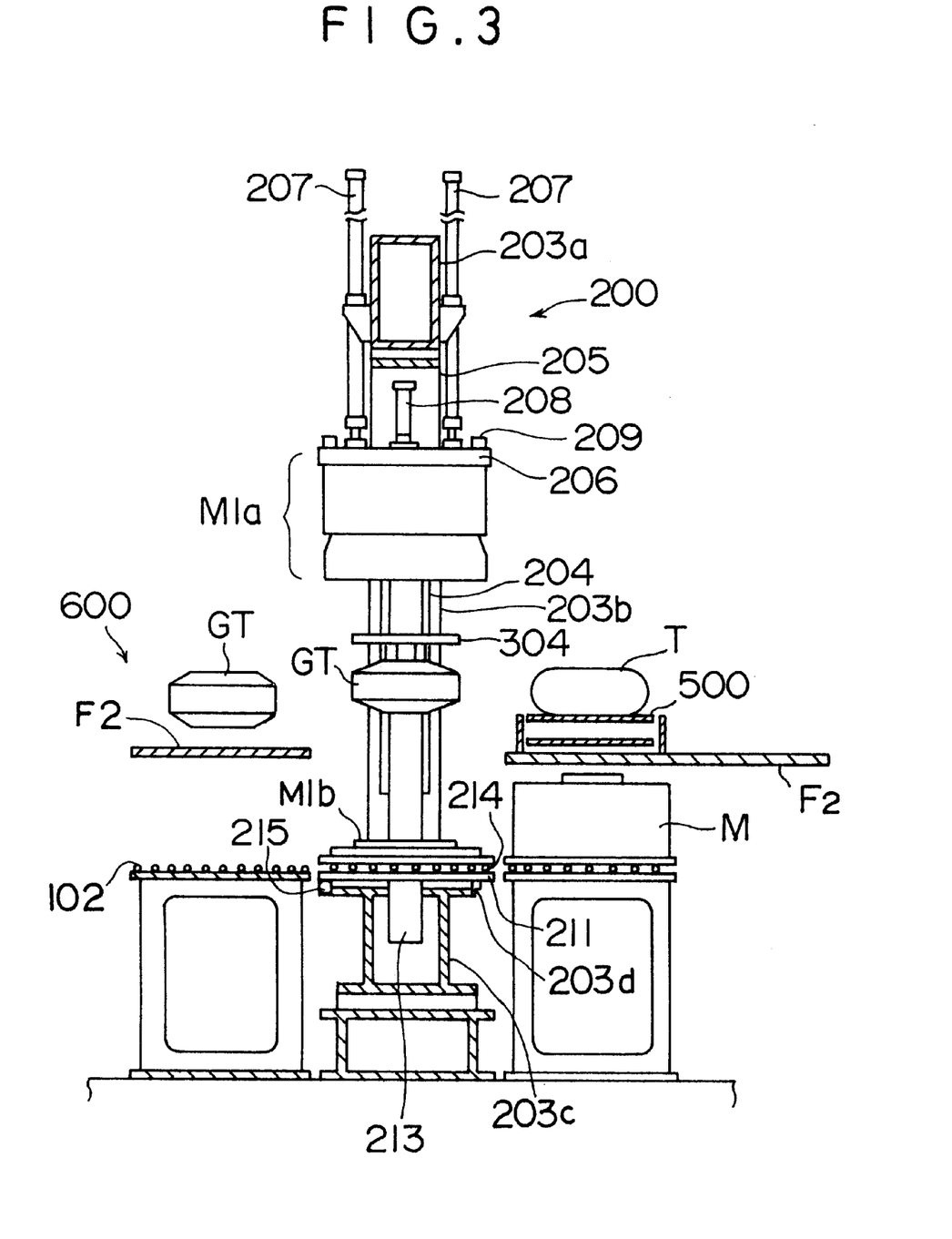
FIG. 3 is a front view taken in the direction of the arrows along the line B—B of FIG. 2.

In front (on the right side in FIG. 1) of the vulcanizing station 100, a mold opening/closing station 200 is arranged. This mold opening/closing station 200 has horizontal straight rails 202 laid on a base 201 and a tire mold opening/closing device 210 sliding on the horizontal straight rails 202. The tire mold opening/closing device 210 comprises, as shown in FIGS. 2 and 3, a frame 203, vertical straight rails 204 provided on pillar portions 203b of the frame 203, a guide bracket 205 sliding on the vertical straight rails 204, an upper movable plate 206 assembled to the guide bracket 205, cylinders 207 one end of which is assembled to the upper movable plate 206 and the other end of which is assembled to a transverse beam 203a of the frame 203, a cylinder 208 for a split mold operating device disposed in the center of the upper movable plate 206, an upper mold connecting device 209 disposed at an appropriate place at the outer peripheral portion of the upper movable plate 206, a bladder operating mechanism 213 provided hangingly in the center of the lower fixed plate 211 on a lower transverse beam 203c of the frame 203, the guide roller group 214 laid on the top surface of the lower fixed plate 211, a stopper 203d provided on the top surface of the lower transverse beam 203c of the frame 203, and a lower mold fixing device (not shown).

On the lower fixed plate 211, a horizontal transfer device 215 is provided to drive the guide roller group 214. The tire mold assembly M is moved horizontally by using this horizontal transfer device 215.

As shown in FIG. 1, the pillar portion 203b of the frame 203 is provided with a loader 300 for a green tire GT on the face of row of even number of the north-side vulcanizing station. This loader 300 comprises a vertical straight rail (not shown) provided on the pillar portion 203*b* of the frame 203, a bracket (not shown) sliding on the vertical straight rail, an arm 303 installed swingably to the bracket, a holder 304 having claws 304*a* provided so as to be capable of being expanded and contracted, and a cylinder (not shown) one end of which is fixed to the bracket and the other end of which is fixed to the frame 203.

On the opposite side (south side face) of the pillar portion 203*b* of the frame 203, an unloader 400 is installed to unload a vulcanized tire T. This unloader 400 has almost the same configuration as that of the loader 300, consisting of a holder 404 having holding claws 404*a*, an arm 403 for swinging the holder 404, and other elements.

As the tire mold assembly M, a tire mold assembly disclosed in Japanese Patent Provisional Publication No. 8-47928 (No. 47928/1996) is used. Specifically, there is used the tire mold assembly M in which a mold opening force is counterbalanced in the mold by the pressure of a high-temperature, high-pressure heating/pressurizing medium introduced in the tire during the vulcanization of tire, by which the necessity of clamping the mold from the outside to prevent the mold from opening is eliminated.

Figure 4:
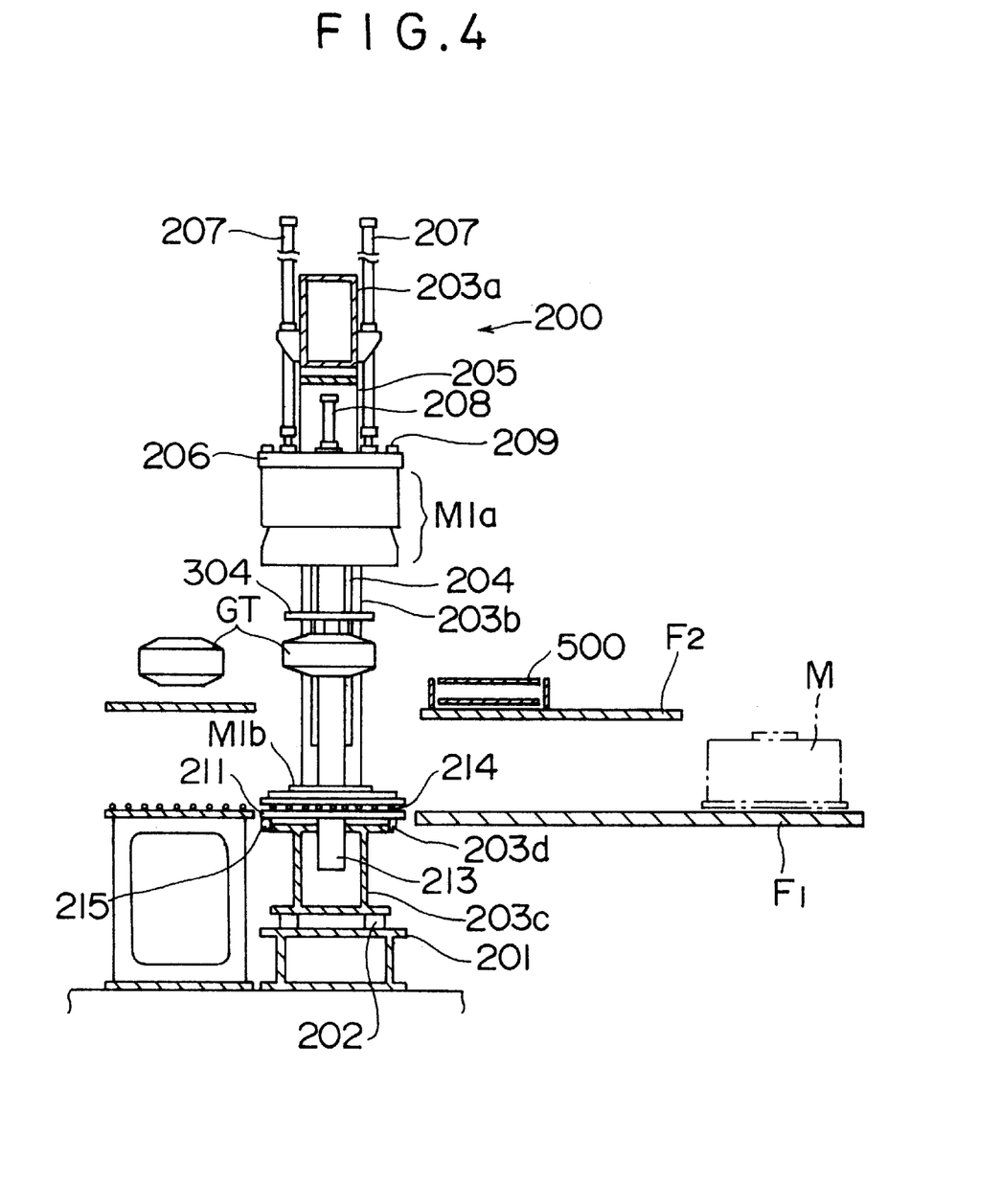
FIG. 4 is a front view of a tire vulcanizing system including a mold change station.

The tire mold assemblies M shown in FIGS. 2 to 4 are of the above-described type, and a tire mold assembly M1 (M1*a*, M1*b*) is in a state of being opened by the operation of the mold opening/closing station 200. An upper mold M1*a* is supported by the upper movable plate 206, and a lower mold M1*b* is supported by the lower fixed plate 211. A bladder BL assembled to the lower mold M1*b* is extended upward by the bladder operating mechanism 213 provided on the lower fixed plate 211.

On the south side of the mold opening/closing station 200, that is, on the side of the unloader 400, a tire delivery conveyor 500 is provided, and on the north side thereof, a green tire supply apparatus 600 is provided. These two apparatuses each are disposed on the upper floor over the vulcanizing station 100. Of the floors F2 for installing the delivery conveyor 500 and the green tire supply apparatus 600, at the lower position on the side of the holder 304 of the loader 300, green tire support beds 601, 602 and 603 are provided. These green tire support beds 601, 602 and 603 are provided at positions which are convenient when the frame 203 moves and performs work at its stop position.

Of these green tire support beds, the bed 601 is used for a green tire for the tire mold assembly M1, the bed 602 is used for a green tire for the tire mold assembly M2, and the bed 603 is used for preparing a green tire for M1 or M2 to be used next. The green tire support beds turn between positions I, II and III. Specifically, when the tire mold opening/closing device 210 stops in front of the tire mold assemblies M1 and M2, the green tire support beds are turned appropriately and stop so that the needed green tire comes just under the holder 304 of the loader 300. At the aforementioned position I, a publicly known aerial carrier moving over this position unloads a green tire having carried from a publicly known automatic warehouse etc.

A floor F1 can be provided at the row end of the vulcanizing station 100 under the aforementioned floor F2 (see FIG. 4), and the floor F1 slidably accommodates a tire mold assembly M to be changed. If a tire mold assembly M is changed after the tire T is removed from the inside of the tire mold assembly M by the operation of the tire mold opening/closing device 210, the tire mold assembly M is closed without the supply of a green tire GT by the tire mold opening/closing device 210, and then is discharged onto the floor F1 by using the horizontal transfer device 215 on the lower fixed plate 211. The discharged tire mold assembly M is carried to a position of the tire mold assembly M indicated by the alternate long and short dash line in FIG. 4, and then the tire mold assembly M is taken away by publicly known means. After a new tire mold assembly M is assembled, it is put at an empty portion of the vulcanizing station 100 by reversing the above procedure. Subsequently, after predetermined operations such as preheating are finished, the new tire mold assembly is sent to the tire mold opening/closing device 210 at an appropriate time, being mounted with a green tire GT, and enters the vulcanizing step.

The following is a description of the operation of the tire vulcanizing system shown in FIGS. 1 to 4. Specifically, the operation of the tire mold assembly M1 (M1*a*, M1*b*) stored at the vulcanizing station 100 is described.

(1) When the completion of tire vulcanization in the tire mold assembly M1 is close at hand, the tire mold opening/closing device 210 at the mold opening/closing station 200 moves in front of the tire mold assembly M1.

(2) When the internal pressure supply device and the external pressure supply device for the tire mold assembly M1 are disconnected, a mold receiving arm on the lower fixed plate 211 of the tire mold opening/closing device 210 is extended in the direction of the tire mold assembly M1, and is connected to the lower part of the tire mold assembly M1.

(3) The mold receiving arm is retreated, and the tire mold assembly M1 slides on the guide roller group 102 at the vulcanizing station 100. Then, the tire mold assembly M1 is transferred onto the guide roller group 214 on the lower fixed plate 211 and slides thereon, and is stopped at a predetermined position. At this time, the upper movable plate 206 lowers to a position slightly higher than the tire mold assembly M1 and waits in such a manner as not to prevent the movement of mold.

(4) After the tire mold assembly M1 stops, the lower mold M1*b* of the tire mold assembly M1 is fixed to the lower fixed plate 211, and at the same time, the upper movable plate 206 lowers and is connected to the upper mold M1*a* of the tire mold assembly M1.

(5) Simultaneously with the start of rise of the upper movable plate 206, the cylinder 208 for the split mold operating device is operated, by which the upper mold M1*a* begins to open. When the upper movable plate 206 continues to rise, the upper mold M1*a* is opened fully, and reaches the upper limit position. The vulcanized tire T is left in the lower mold M1*b*. The bladder operating mechanism 213 provided in the center of the lower fixed plate 211 is operated, so that the bladder BL is separated from the inside of tire.

(6) The arm 403 of the unloader 400 enters the tire mold opening/closing device 210 at an appropriate time and lowers so that the holder 404 holds an upper bead portion of the vulcanized tire T in the lower mold M1*b*, and rises, whereby the vulcanized tire T is carried out. The carried-out vulcanized tire T is placed on the tire delivery conveyor 500.

(7) The holder 304 of the loader 300 holds a green tire GT at an appropriate time, enters the tire mold opening/closing device 210, and lowers, by which the green tire GT is mounted in the lower mold M1*b*. The bladder operating mechanism 213 is operated, so that the bladder BL is inserted in the green tire GT.

(8) The loader 300 releases the green tire GT at an appropriate time, rises, and retreats. Then, the upper movable plate 206 lowers, and the upper mold M1*a* having being opened moves to the closing position.

(9) After the completion of closing, the upper movable plate 206 and the upper mold M1*a* are disconnected from each other, so that the upper movable plate 206 rises to a height such that the tire mold assembly M can pass through. On the other hand, the lower fixing plate 211 and the lower mold M1*b* are disconnected from each other.

(10) The mold receiving arm on the lower fixed plate 211 performs a pushing operation, so that the tire mold assembly M1 on the lower fixed plate 211 is returned to the original position at the vulcanizing station 100. The mold receiving arm and the tire mold assembly M1 are disconnected from each other, so that the mold receiving arm is returned to the side of the lower fixed plate 211.

(11) The internal pressure supply device and the external pressure supply device are connected to the tire mold assembly at the vulcanizing station 100, by which vulcanization is started. On the other hand, the tire mold opening/closing device 210 moves to a position in front of the tire mold assembly M to be operated next. For the tire vulcanizing system having the above-described configuration, the green tire supply apparatus and the vulcanized tire delivery conveyor are provided over the vulcanizing station on each side of the mold opening/closing station. Therefore, not only a green tire supply system using an aerial carrier can be used but also a green tire can be loaded by the loader before the unloader completely arrives at the retreat position.

What is claimed is:

1. A tire vulcanizing system, comprising:

a vulcanizing station having a plurality of sets of tire mould assemblies arranged along at least one straight line, a tire mould opening/closing station arranged proximate the vulcanizing station, a first conveyor for feeding green tires to the tire mould opening/closing station, a second conveyor for removing vulcanized tires from the tire mould opening/closing station, and a loader/unloader for unloading a vulcanized tire from the tire mould opening/closing station and loading a green tire to the tire mould opening/closing station; the tire mould opening/closing station comprising a tire mould opening/closing device and conveying means for integrally moving the loader/unloader together with the tire mould opening/closing device along a straight path parallel to said straight line and facing the vulcanizing station; the tire mould opening/closing device comprising a moving device for moving one tire mould assembly from the vulcanizing station to the tire mould opening/closing device and back, and opening/closing means for opening/closing the tire mould assembly arranged in the opening/closing device by separating/coupling an upper mould of the tire mould assembly from/to a lower mould of the tire mould assembly; the tire mould assemblies in the vulcanizing station being arranged at a same predetermined height in order to be at the same height as the tire mould opening/closing device and being arranged in two parallel straight lines, with the tire mould opening/closing station being located between said straight lines; the first conveyor being arranged over and parallel to a first straight line, and the second conveyor being arranged over and parallel to a second straight line; and the loader/unloader comprising a first arm arranged in front of the first conveyor for loading a green tire to the tire mould opening/closing station and a second arm arranged in front of the second conveyor for unloading a vulcanized tire from the tire mould opening/closing station such that the unloading of the vulcanized tires and the loading of the green tires occurs on opposite sides of said straight path.

2. A system according to claim 1, wherein said opening/closing means comprises an upper movable plate capable of elevating said upper mould of the tire mould assembly, and a lower fixed plate capable of fixing said lower mould of the tire mould assembly.

* * * * *

UNITED STATES PATENT AND TRADEMARK OFFICE
CERTIFICATE OF CORRECTION

PATENT NO.     : 6,530,763 B2
DATED          : March 11, 2003
INVENTOR(S)    : Irie It is certified that error appears in the above-identified patent and that said Letters Patent is hereby corrected as shown below:

Title page,
Insert the following:
-- [74] *Attorney, Agent, or Firm* - Alston & Bird LLP --.

Column 8,
Line 24, after "said" insert -- two parallel --.

Signed and Sealed this

Nineteenth Day of August, 2003

JAMES E. ROGAN
*Director of the United States Patent and Trademark Office*